United States Patent
Alfred et al.

(10) Patent No.: US 6,791,791 B1
(45) Date of Patent: Sep. 14, 2004

(54) DISK DRIVE WITH DISKS HAVING DIFFERENT DISK STIFFNESS, THICKNESS AND MATERIAL COMBINATIONS

(75) Inventors: Steven J. Alfred, Longmont, CO (US); Raffi Codilian, Irvine, CA (US); Serge Hauert, San Jose, CA (US); Lin Yang, San Jose, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 220 days.

(21) Appl. No.: 10/010,673

(22) Filed: Nov. 30, 2001

(51) Int. Cl.$^7$ ............................................... G11B 17/08
(52) U.S. Cl. .................................................. 360/98.08
(58) Field of Search .......................... 360/135, 97.01, 360/97.02, 97.03, 98.01, 98.08, 99.12

(56) References Cited

U.S. PATENT DOCUMENTS

| | | | |
|---|---|---|---|
| 3,940,794 A | * | 2/1976 | Griffiths et al. .......... 360/98.03 |
| 4,683,505 A | | 7/1987 | Schmidt et al. |
| 5,235,482 A | | 8/1993 | Schmitz |
| 5,400,196 A | | 3/1995 | Moser et al. |
| 5,483,397 A | | 1/1996 | Gifford et al. |

FOREIGN PATENT DOCUMENTS

| | | | | |
|---|---|---|---|---|
| JP | 04205776 A | * | 7/1992 | ........... G11B/25/04 |
| JP | 05114268 A | * | 5/1993 | ........... G11B/23/03 |
| JP | 09212880 A | * | 8/1997 | ............ G11B/7/09 |
| JP | 2001266338 A | * | 9/2001 | ............ G11B/5/84 |

OTHER PUBLICATIONS

"Disk drive disk stack assembly for reduced disk vibration consists of two standard thickness and diameter disks paired back to back where paired disks become functional disks in new disk stack assembly," Dec. 10, 2000, IBM Pub. No. RD 440147 A.*

* cited by examiner

*Primary Examiner*—William Klimowicz
(74) *Attorney, Agent, or Firm*—Won Tae C. Kim, Esq.; Milad G. Shara, Esq.; Stetina Brunda Garred & Brucker

(57) ABSTRACT

An aspect of the invention can be regarded as a disk drive that includes a disk drive base and a spindle motor hub rotatably coupled to the disk drive base. The disk drive further includes a first disk disposed about the spindle motor hub and having a first disk stiffness. The disk drive further includes a second disk disposed about the spindle motor hub and having a second disk stiffness different than the first disk stiffness. According to another aspect of the present invention, the second disk has a second disk thickness different than a first disk thickness. According to another aspect of the present invention, the second disk is formed of a second material having a second material stiffness different than a first material stiffness.

36 Claims, 3 Drawing Sheets

DISK DRIVE WITH DISKS HAVING DIFFERENT DISK STIFFNESS, THICKNESS AND MATERIAL COMBINATIONS

BACKGROUND OF THE INVENTION

CROSS-REFERENCE TO RELATED APPLICATIONS

Not applicable.

1. Field of the Invention

The present invention relates generally to disk drives, and in particular to a disk drive including disks having different disk stiffness, thickness and material combinations.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The head stack assembly has an actuator assembly having at least one head or slider, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly and a flex circuit cable assembly that are attached to the actuator assembly. A conventional "rotary" or "swing-type" actuator assembly typically comprises an actuator body, a pivot bearing cartridge, a coil portion that extends from one side of the actuator body to interact with one or more permanent magnets to form a voice coil motor, and one or more actuator arms which that extend from an opposite side of the actuator body. The actuator body includes a bore and the pivot bearing cartridge engaged within the bore for allowing the actuator body to rotate between limited positions. At least one head gimbal assembly ("HGA") is distally attached to each of the actuator arms. A head gimbal assembly includes a head for reading and writing data to and from the disks. In this regard, the actuator assembly is controllably rotated so as to move the heads relative to the disks for reading and writing operations with respect to the tracks contained on the disks.

It is contemplated that during operation of the disk drive, the inner disks may be subjected to different air flow conditions than the outermost disks, such as those adjacent the disk clamp and spindle motor hub flange. This is because the inner disks are disposed adjacent the other disks which are similarly rotating. Whereas the outermost disks are each disposed adjacent a similarly rotating structure (e.g., an innermost disk) and a respective stationary structure (e.g., the interior of the cover and the disk drive base among other disk drive components). Such differing air flow environments are contemplated to impact the motion of the disks differently. Comparatively, the inner disks are observed to have a higher degree of disk motion due to such air flow environment (i.e., disk flutter). Such disk flutter affects the position errors associated with positioning of the heads relative to the disks. In addition, it is contemplated that because the disks are repeating similarly configured structures in close proximity to each other, the disks may tend to become sources of resonance excitation to an adjacent disk resulting in relatively increased vibration amplitudes. Such relatively increased resonance amplitudes also impact to position errors associated with positioning of the heads relative to the disks. Accordingly, there is a need in the art for an improved disk drive in comparison to the prior art.

SUMMARY OF THE INVENTION

An aspect of the invention can be regarded as a disk drive that includes a disk drive base and a spindle motor hub rotatably coupled to the disk drive base. The disk drive further includes a first disk disposed about the spindle motor hub and having a first disk stiffness. The disk drive further includes a second disk disposed about the spindle motor hub and having a second disk stiffness different than the first disk stiffness.

According to various embodiments, the first disk may be an outermost disk and the second disk is an inner disk. The disk drive may further include a disk clamp, and the first disk may be disposed adjacent the disk clamp. The spindle motor hub may include a hub flange, and in another embodiment the first disk may be disposed adjacent the hub flange. The second disk stiffness may be greater than the first disk stiffness. The first disk may be formed of a material different than that of the second disk. For example, the first disk may be formed of a metallic substrate and the second disk may be formed of a glass substrate. The first or second disks may further be formed of a ceramic substrate. The first disk may have a thickness different than the second disk. Where the first disk is an outermost disk and the second disk is an inner disk, the second disk may have a thickness greater than the thickness of the first disk.

According to another aspect of the invention, there is provided a disk drive that includes a disk drive base and a spindle motor hub rotatably coupled to the disk drive base. The disk drive may further include a first disk disposed about the spindle motor hub and having a first disk thickness. The disk drive may further include a second disk disposed about the spindle motor hub and having a second disk thickness different than the first disk thickness.

According to various embodiments, the first disk may be an outermost disk and the second disk is an inner disk. The disk drive may further include a disk clamp, and the first disk may be disposed adjacent the disk clamp. The spindle motor hub may include a hub flange, and in another embodiment the first disk may be disposed adjacent the hub flange. The second disk thickness may be greater than the first disk thickness. The first disk has a first disk stiffness, and the second disk may have a second disk stiffness greater than the first disk stiffness. The first disk is formed of a first material having a first material stiffness, and the second disk may be formed of a second material having second material stiffness different than the first material stiffness. For example, the first disk is formed of a metallic substrate and the second disk is formed of a glass substrate. The first or second disks may further be formed of a ceramic substrate. In another embodiment, the first disk is formed of a material the same as the second disk.

According to another aspect of the invention, there is provided a disk drive that includes a disk drive base and a spindle motor hub rotatably coupled to the disk drive base. The disk drive may further include a first disk disposed about the spindle motor hub and formed of a first material having a first material stiffness. The disk drive may further include a second disk disposed about the spindle motor hub and formed of a second material having a second material stiffness different than the first material stiffness.

According to various embodiments, the first disk may be an outermost disk and the second disk is an inner disk. The disk drive may further include a disk clamp, and the first disk may be disposed adjacent the disk clamp. The spindle motor hub may include a hub flange, and in another embodiment the first disk may be disposed adjacent the hub flange. The first disk has a first disk thickness, and the second disk may have a second disk thickness the same of the first disk thickness. The first disk has a first disk stiffness, and the second disk may have a second disk stiffness is greater than the first disk stiffness. The first disk may be formed of a metallic substrate and the second disk may be formed of a glass substrate. The first or second disks may further be formed of a ceramic substrate. In another embodiment, the second disk may have a second disk stiffness substantially the same as the first disk stiffness.

DESCRIPTION OF THE PREFERRED EMBODIMENTS

Figure 1:
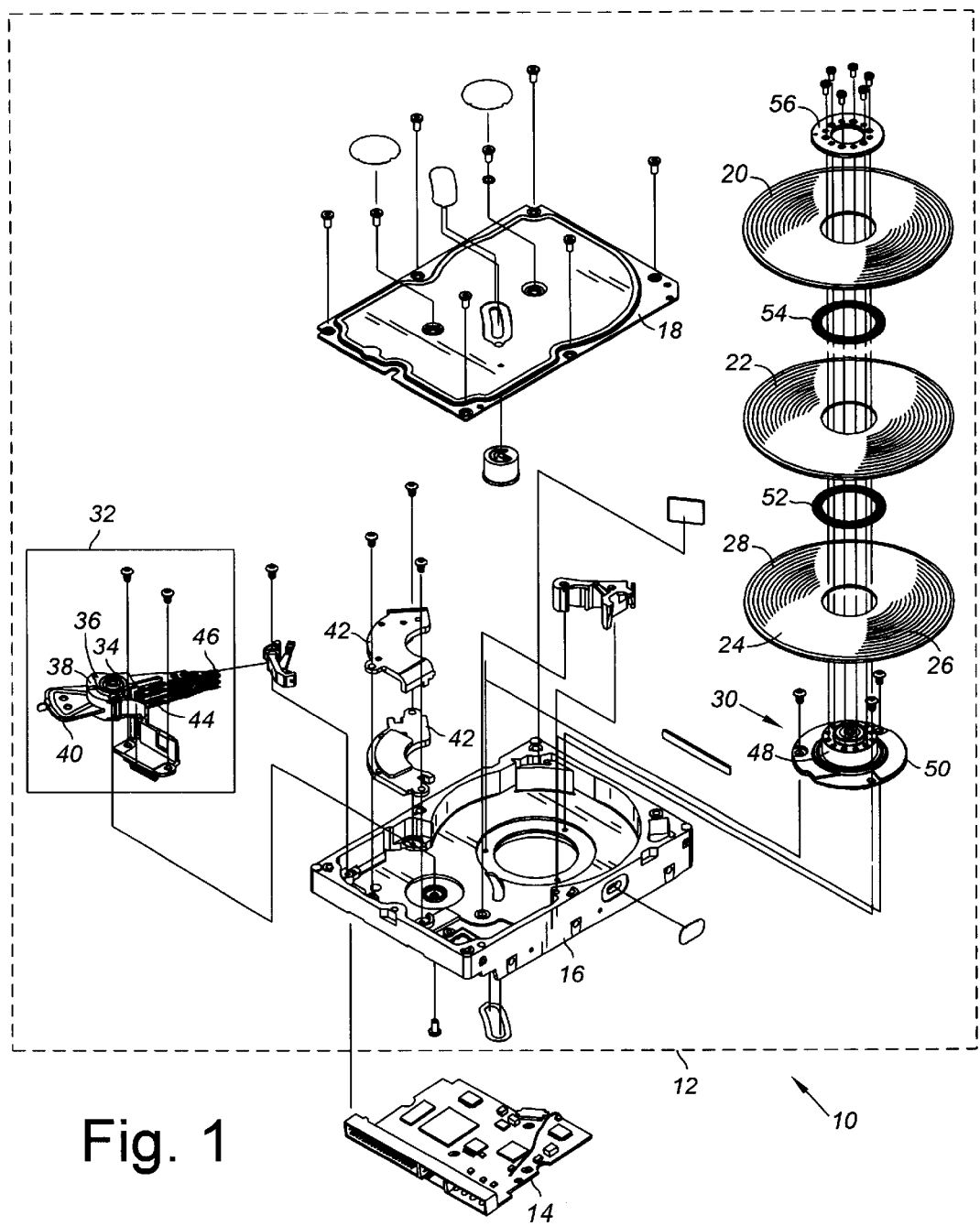
FIG. 1 is an exploded perspective view of a disk drive as constructed in accordance with aspects of the present invention.

Referring now to the drawings wherein the showings are for purposes of illustrating preferred embodiments of the present invention only, and not for purposes of limiting the same, FIGS. 1–5 illustrate a disk drive in accordance with the aspects of the present invention.

Figure 2:
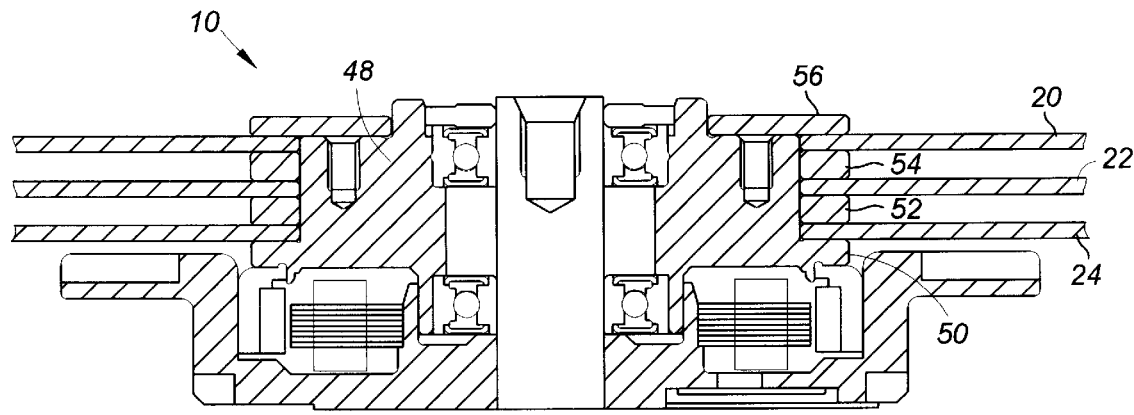
FIG. 2 is an enlarged cross sectional view of a portion of the disk drive of FIG. 1.
Figure 3:
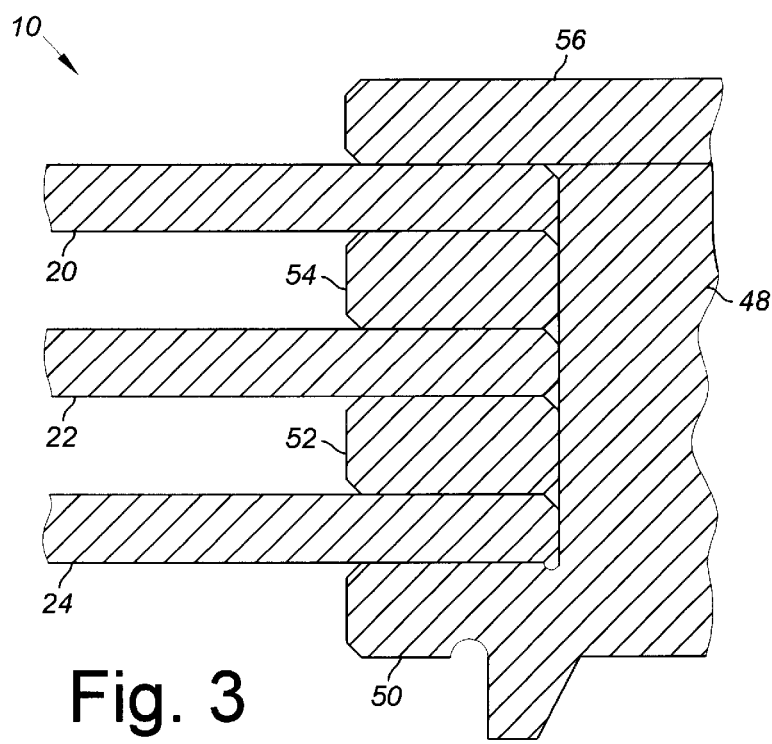
FIG. 3 is a further enlarged cross sectional view of a portion of the disk drive of FIG. 2 including portions of a disk clamp, disks and a hub flange.

Referring now to FIG. 1 there is depicted an exploded perspective view of a disk drive 10 constructed in accordance with an aspect of the present invention. In addition, FIG. 2 is an enlarged cross sectional view of a portion of the disk drive 10 of FIG. 1, and FIG. 3 is a further enlarged cross sectional view of a portion of the disk drive 10 of FIG. 2. In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on upper facing side and a track 28 (shown in phantom) on a lower facing side. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies associated with the adjacent sides of the disks 20, 22, 24. Each head gimbal assembly includes a head (the uppermost one being denoted 46) for reading and writing data to and from the disks 20, 22, 24.

The spindle motor 30 includes a spindle motor hub 48 that is rotatably attached to the disk drive base 16. The spindle motor hub 48 has a hub flange 50 that supports a lowermost one of the disks, namely disk 24. The remaining disks 22, 20 are stacked and separated with annular disk spacers 52, 54 that are disposed about the spindle motor hub 48. A disk clamp 56 is attached about the spindle motor hub 48 and is utilized to apply a clamping force against the topmost disk 20 for securing all the disks 20, 22, 24 to the spindle motor hub 48. The spindle motor 30 typically includes a spindle motor base that is attached to the disk drive base 12. A shaft is coupled to the spindle motor base and the spindle motor hub 48 surrounds the shaft. The spindle motor hub 48 may be rotatably coupled to the shaft and therefore the spindle motor base typically via a pair of bearing sets. A stator is positioned about the shaft and is attached to the spindle motor base. A magnet element is attached at bottom portion of the hub flange 50. The stator includes windings that selectively conduct current to create a magnetic field that interacts with the various poles of the magnet element. Such interaction results in forces applied to the spindle motor hub 48 that tend to rotate the spindle motor hub 48 and the attached disks 20, 22, 24.

An aspect of the invention can be regarded as the disk drive 10 that includes the disk drive base 16 and the spindle motor hub 48 which is rotatably coupled to the disk drive base 16. The disk drive 10 further includes a first disk, such as disk 20, disposed about the spindle motor hub 48 and having a first disk stiffness. The disk drive 10 further includes a second disk, such as disk 22, disposed about the spindle motor hub 48 and having a second disk stiffness which is different than the first disk stiffness.

As used herein the term different is used to denote that which is beyond normal manufacturing tolerances, but rather are designed as such. Thus in this embodiment, the disks 20, 24 are constructed to have a disk stiffness which is different than the disk stiffness of the disk 22, and such amount of such difference is greater than the manufacturing tolerances of such respective disks 20, 22, 24.

According to various embodiments, the first disk may be an outermost disk, such as disk 20 or 24, and the second disk is an inner disk, such as disk 22. As mentioned above, the disk drive 10 includes a disk clamp 56. In this regard, the disk 20 is disposed adjacent the disk clamp 56. The spindle motor hub 48 includes a hub flange 50. The disk 24 is disposed adjacent the hub flange 50. The outermost disks 20, 24 may each be formed to have a disk stiffness greater than the disk stiffness of the inner disk 22.

It is contemplated that during operation of the disk drive 10, the inner disk 22a may be subjected to different air flow conditions than the outermost disks 20, 24. This is because the inner disk 22 is disposed adjacent the disks 20, 24 which are similarly rotating. Whereas the outermost disks 20, 24 are each disposed adjacent a similarly rotating structure (e.g., disk 22) and a respective stationary structure (e.g., the interior of the cover 18 and the disk drive base 16 among other disk drive components). Such differing air flow environments are contemplated to impact the motion of the disks 20, 22, 24 differently. Comparatively, the inner disk 22 is observed to have a higher degree of disk motion or vibration due to such air flow environment (i.e., disk flutter). Such disk flutter affects the position errors associated with positioning of the heads 46 relative to the disks 20, 22, 24. It is contemplated that by designing the inner disk 22 to have a relatively greater disk stiffness, the position errors associated with the inner disk 22 may be designed to be comparable to those of the outer disks 20, 24.

In addition, it is contemplated that by designing at least one of the disks 20, 22, 24 to have a different disk stiffness, this results is differences in the resonance modes of such disks 20, 22, 24. Such different resonance modes tend to avoid the disks respectively being a resonance excitation source of the adjacent disk resulting in relatively increased vibration amplitudes. Such relatively increased resonance amplitudes impact to position errors associated with positioning of the heads 46 relative to the disks 20, 22, 24. Thus, by designing the disks 20, 22, 24 to have at least one of the disks 20, 22, 24 to have a different disk stiffness this tends to decouple any mutual or cross excitation of resonance modes.

Figure 4:
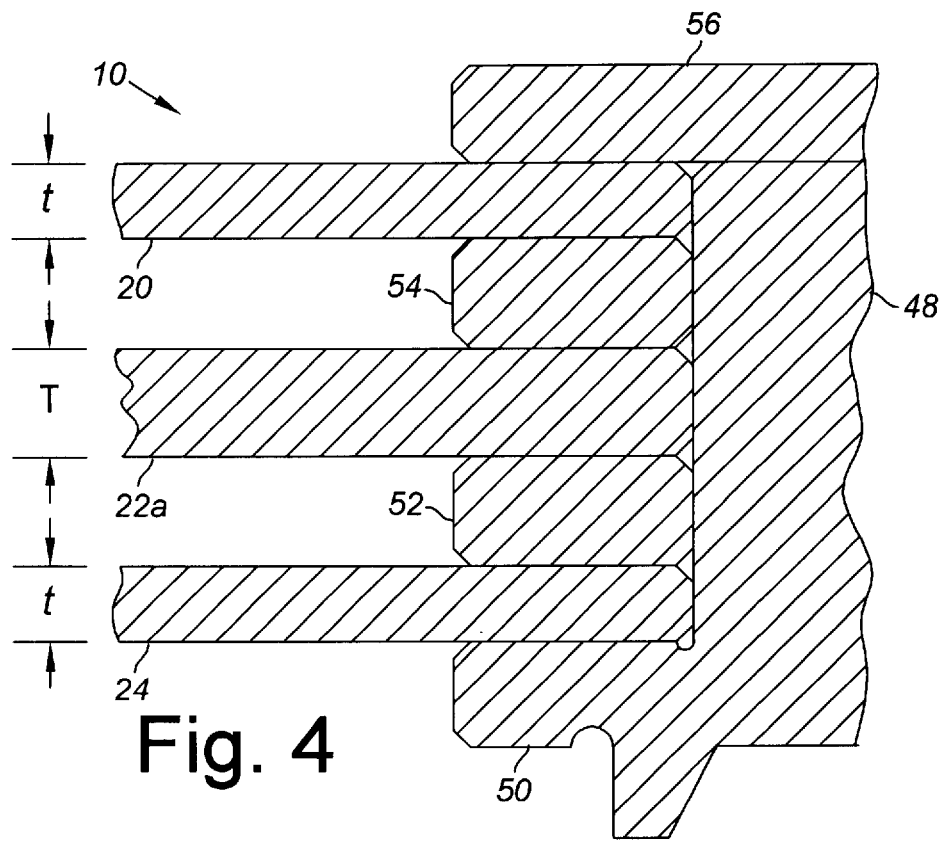
FIG. 4 is a view similar to FIG. 3 of another embodiment of the present invention including disks of different thickness.

Such different disk stiffness are contemplated to be achieved through various means. Referring now to FIG. 4, according to another embodiment of the present invention, there is depicted an enlarged cross sectional view of a portion of the disk drive 10 similar to that of FIG. 3 with common reference numerals used to indicate like elements. In this embodiment, the disk 22 is substituted with a disk 22a. The disk 22a has a disk thickness T. The disks 20, 24 each have a disk thickness t. It is contemplated that the disks 20, 22a, 24 may have different disk stiffnesses achieved through differences of their respect disk thicknesses, such as denoted T and t. As depicted, the disk 22a has the disk thickness T which is greater than the disk thickness t of the disks 20, 24. In this regard, the inner disk 22a is constructed to have a disk stiffness greater than the disk stiffness of both the disks 20, 24. It is understood that other relative thicknesses are contemplated. As such the outermost disks 20, 24 may have different disk thicknesses with respect to each of other, and may be each greater than the disk thickness of inner disk 22a. Moreover, though not shown, the disk drive 10 may at the least have only two disks, and may even have additional disks. Further, the disks 20, 22a, 24 may have substrates respectively formed of the same material or differing materials as discussed below.

Figure 5:
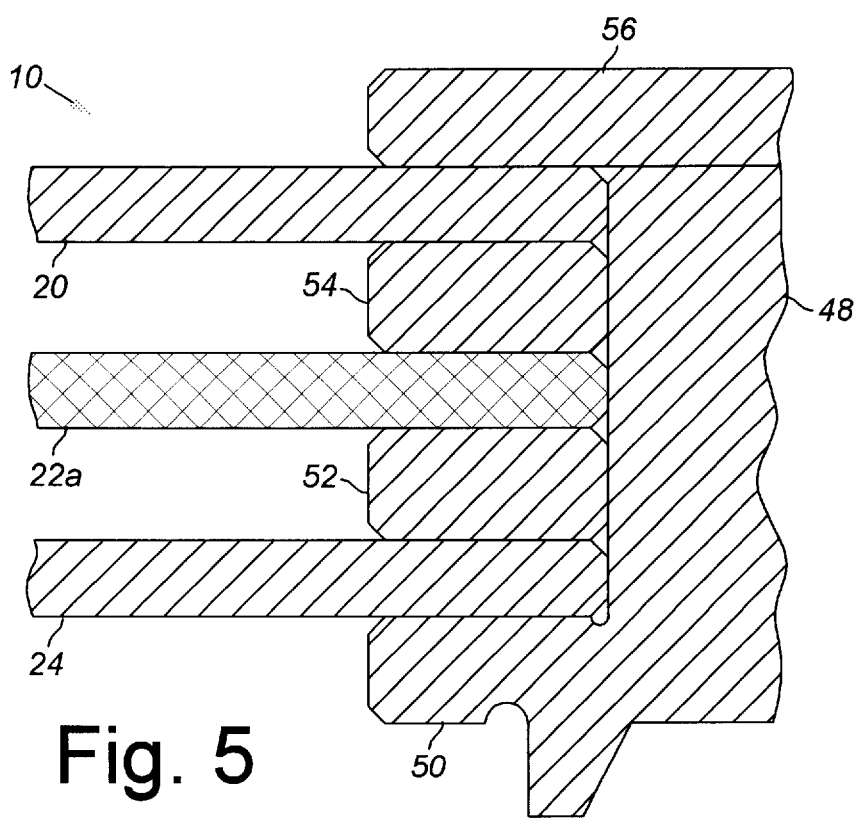
FIG. 5 is a view similar to FIG. 3 of another embodiment of the present invention including disks of different materials.

Referring now to FIG. 5, according to another embodiment of the present invention, there is depicted an enlarged cross sectional view of a portion of the disk drive 10 similar to that of FIG. 3 with common reference numerals used to indicate like elements. In this embodiment, the disk 22 is substituted with a disk 22b. The disks 20, 24 are formed of a first material having associated with is a first material stiffness. The disk 22b is formed of a second material having associated with it a second material stiffness different than the first material stiffness. In this regard, disks 20, 24 are depicted with a hatch pattern different than that of disk 22b to symbolically indicate such different material selection. It is contemplated that the disks 20, 22b, 24 may have different disk stiffnesses achieved through differences of their respect materials having different material stiffnesses. As an example, the material stiffness of the inner disk 22b may be greater than that of the outermost disks 20, 24, so as to result in an overall disk stiffness of disk 22b being respectfully greater than disks 20, 24.

The disks 20, 22b, 24 may have substrates formed of such different materials so as to include metal, glass and ceramics. Thus, the disk 22b may have a substrate formed of glass (i.e., including glass) and the disks 20, 24 may respectively have substrates formed of glass. Glass substrates typically have a greater material stiffness than that of metals commonly utilized for disk drive applications. Further, for a given material type, such as metal, the disks 20, 22b, 24 may be formed of differing metals. In addition, such materials may be of a composite or laminate nature.

Referring again to FIG. 4, according to another aspect of the invention, there is provided the disk drive 10 that includes the disk drive base 16 and the spindle motor hub 48 rotatably coupled to the disk drive base 16. The disk drive 10 includes a first disk, such as disks 20 or 24, disposed about the spindle motor hub 48 and having a first disk thickness, such as disk thickness t. The disk drive 10 includes a second disk, such as disk 22a, disposed about the spindle motor hub 48 and having a second disk thickness, such as disk thickness T, different than the first disk thickness. Thus, in this embodiment, the disks 20, 24 are constructed to have a disk thickness which is different than the disk thickness of the disk 22a, and such amount of such difference is greater than the manufacturing tolerances of such respective disks 20, 22a, 24.

According to various embodiments, the first disk, such as the disks 20 or 24, may have a first disk stiffness, and the second disk, such as the disk 22a, may have a second disk stiffness greater than the first disk stiffness such as discussed above. However, in this embodiment according to this aspect of the present invention, the disks 20, 22a, 24 may be constructed to have the same disk stiffnesses. As used herein the term same denotes being within certain specified manufacturing tolerances. In this regard, the disks 20, 22a, 24 may be designed to have the same disk stiffnesses through additionally varying the materials used to form such disks 20, 22a, 24. Thus, according to another embodiment, the disk 20, 24 are formed of a first material having associated with is a first material stiffness. The disk 22a is formed of a second material having associated with it a second material stiffness different than the first material stiffness. As an example, the material stiffness of the inner disk 22a may be the less than that of the outermost disks 20, 24, so as to result in an overall disk stiffness of disk 22a being the same as the disks 20, 24.

Referring again to FIG. 5, according to another aspect of the present invention, there is provided the disk drive 10 that includes the disk drive base 16 and the spindle motor hub 48 rotatably coupled to the disk drive base 16. The disk 10 includes a first disk, such as the disks 20, 24, which is disposed about the spindle motor hub 48 and is formed of a first material having a first material stiffness. The disk drive 10 further includes a second disk, such as the disk 22b, which is disposed about the spindle motor hub 48 and is formed of a second material having a second material stiffness different than the first material stiffness. Thus in this embodiment, the disks 20, 24 may be constructed of a material having a material stiffness which is different than the material stiffness of the disk 22b, and such amount of such difference is greater than the manufacturing tolerances of such respective materials of such disks 20, 22b, 24.

According to various embodiments, the disks 20, 22b, 24 may have substrates formed of such different materials so as to include metal, glass and ceramics. Thus, the disk 22b may have a substrate formed of glass (i.e., including glass) and disks 20, 24 may respectively have substrates formed of glass. Glass substrates typically have a greater material stiffness than that of metals commonly utilized for disk drive applications. Further, for a given material type, such as metal, the disks 20, 22b, 24 may be formed of differing metals. In addition, such materials may be of a composite or laminate nature. According to another embodiment, the first disk, such as disks 20 or 24 may have a first disk stiffness, and the second disk, such as disk 22b, may have a second disk stiffness greater than the first disk stiffness such as discussed above. However, in this embodiment according to this aspect of the present invention, the disks 20, 22b, 24 may be constructed to have the same disk stiffnesses. As used herein the term same denotes being within certain specified manufacturing tolerances. In this regard, the disks 20, 22b, 24 may be designed to have the same disk stiffnesses through additionally varying the relative disk thicknesses of such disks 20, 22b, 24 (such as discussed in the context of FIG. 4 above).

We claim:

1. A disk drive comprising:
   a disk drive base;
   a spindle motor hub rotatably coupled to the disk drive base;
   a disk clamp disposed about the spindle motor hub;
   a first disk disposed about the spindle motor hub adjacent the disk clamp and having a first disk stiffness; and
   a second disk disposed about the spindle motor hub, the first disk being disposed between the disk clamp and the second disk, the second disk having a second disk stiffness greater than the first disk stiffness.

2. The disk drive of claim 1 wherein the first disk is an outermost disk and the second disk is an inner disk.

3. The disk drive of claim 1 wherein the spindle motor hub includes a hub flange, the second disk is disposed between the first disk and the hub flange.

4. The disk drive of claim 1 wherein the first disk has a thickness different than the second disk.

5. The disk drive of claim 4 the first disk is an outermost disk and the second disk is an inner disk, the second disk having a thickness greater than a thickness of the first disk.

6. The disk drive of claim 1 wherein one of the first or second disk is formed of a metal substrate.

7. The disk drive of claim 1 wherein one of the first or second disk is formed of a glass substrate.

8. The disk drive of claim 1 wherein one of the first or second disk is formed of a ceramic substrate.

9. A disk drive comprising:
   a disk drive base;
   a spindle motor hub rotatably coupled to the disk drive base;
   a disk clamp disposed about the spindle motor hub;
   a first disk disposed about the spindle motor hub adjacent the disk clamp and having a first disk thickness; and
   a second disk disposed about the spindle motor hub, the first disk being disposed between the disk clamp and the second disk, the second disk having a second disk thickness greater than the first disk thickness.

10. The disk drive of claim 9 wherein the first disk is an outermost disk and the second disk is an inner disk.

11. The disk drive of claim 10 wherein the first disk is formed of a material the same as the second disk.

12. The disk drive of claim 9 wherein the spindle motor hub includes a hub flange, the second disk is disposed between the first disk and the hub flange.

13. The disk drive of claim 9 wherein the first disk has a first disk stiffness, the second disk has a second disk stiffness is greater than the first disk stiffness.

14. The disk drive of claim 9 wherein the first disk has a first disk stiffness, the second disk has a second disk stiffness substantially the same as the first disk stiffness.

15. The disk drive of claim 9 wherein one of the first or second disk is formed of a metal substrate.

16. The disk drive of claim 9 wherein one of the first or second disk is formed of a glass substrate.

17. The disk drive of claim 9 wherein one of the first or second disk is formed of a ceramic substrate.

18. The disk drive of claim 9 wherein the first disk is formed of a material the same as the second disk.

19. A disk drive comprising:
   a disk drive base,
   a spindle motor hub rotatably coupled to the disk drive base, the spindle motor including a hub flange;
   a first disk disposed about the spindle motor hub adjacent the hub flange and having a first disk stiffness; and
   a second disk disposed about the spindle motor hub, the first disk being disposed between the hub flange and the second disk, the second disk having a second disk stiffness greater than the first disk stiffness.

20. The disk drive of claim 19 wherein the first disk is an outermost disk and the second disk is an inner disk.

21. The disk drive of claim 19 further includes a disk clamp disposed about the spindle motor hub, the second disk is disposed between the first disk and the disk clamp.

22. The disk drive of claim 19 wherein the first disk has a thickness different than the second disk.

23. The disk drive of claim 22 wherein the first disk is an outermost disk and the second disk is an inner disk, the second disk having a thickness greater than a thickness of the first disk.

24. The disk drive of claim 19 wherein one of the first or second disk is formed of a metal substrate.

25. The disk drive of claim 19 wherein one of the first or second disk is formed of a glass substrate.

26. The disk drive of claim 19 wherein one of the first or second disk is formed of a ceramic substrate.

27. A disk drive comprising:
   a disk drive base;
   a spindle motor hub rotatably coupled to the disk drive base, the spindle motor hub having a hub flange;
   a first disk disposed about the spindle motor hub adjacent the hub flange and having a first disk thickness; and a second disk disposed about the spindle motor hub, the first disk being disposed between the hub flange and the second disk, the second disk having a second disk stiffness greater than the first disk stiffness.

28. The disk drive of claim 27 wherein the first disk is an outermost disk and the second disk is an inner disk.

29. The disk drive of claim 28 wherein the first disk is formed of a material the same as the second disk.

30. The disk drive of claim 27 further includes a disk clamp disposed about the spindle motor hub, the second disk is disposed between the first disk and the disk clamp.

31. The disk drive of claim 27 wherein the first disk has a first disk thickness, the second disk has a second disk thickness is greater than the first disk thickness.

32. The disk drive of claim 27 wherein the first disk has a first disk thickness, the second disk has a second disk thickness substantially the same as the first disk thickness.

33. The disk drive of claim 27 wherein one of the first or second disk is formed of a metal substrate.

34. The disk drive of claim 27 wherein one of the first or second disk is formed of a glass substrate.

35. The disk drive of claim 27 wherein one of the first or second disk is formed of a ceramic substrate.

36. The disk drive of claim 27 wherein the first disk is formed of a material the same as the second disk.

* * * * *